Feb. 20, 1940.  H. W. KRANZ  2,191,202
VEHICLE WHEEL
Filed Nov. 19, 1934  2 Sheets-Sheet 1
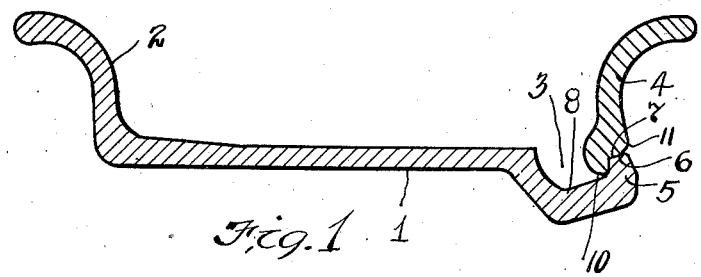
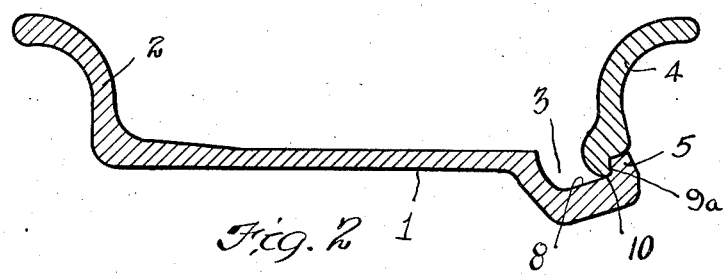
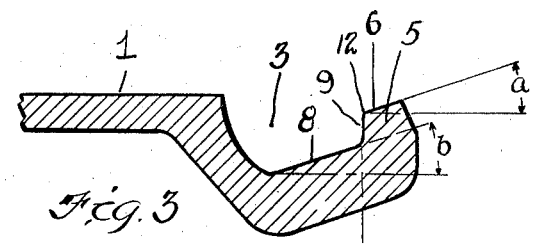
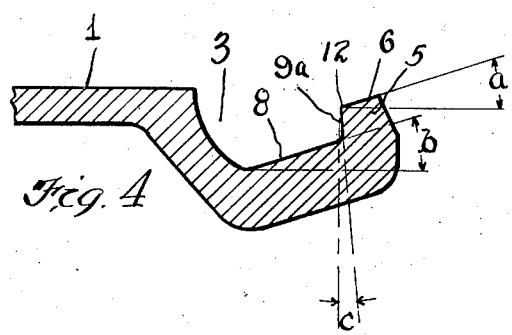
INVENTOR.
Harry W. Kranz
BY Fay, Oberlin & Fay
ATTORNEYS Feb. 20, 1940.  H. W. KRANZ  2,191,202
VEHICLE WHEEL
Filed Nov. 19, 1934  2 Sheets-Sheet 2
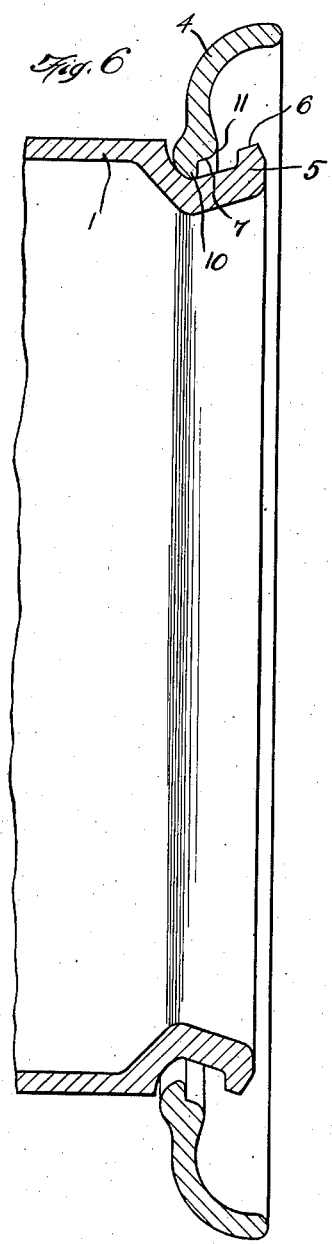
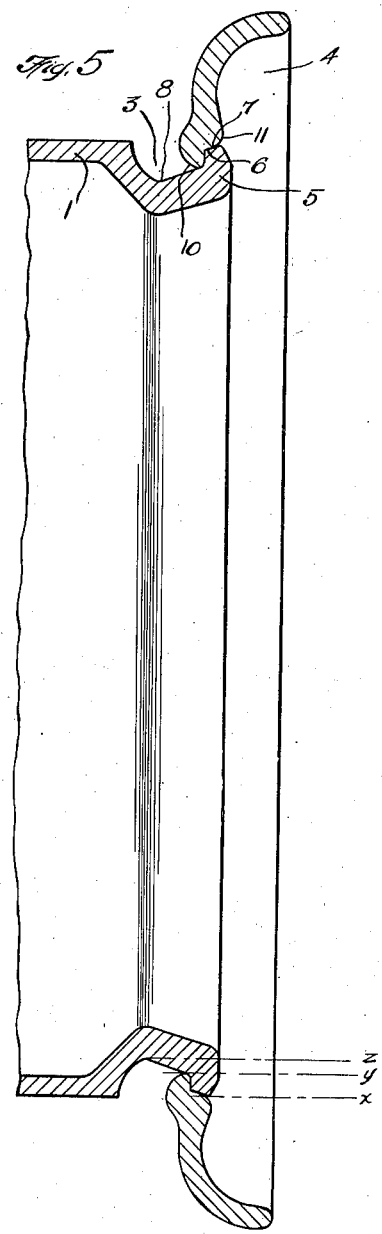
INVENTOR.
Harry W. Kranz
BY
Raff, Oberlin & Ray
ATTORNEYS, Patented Feb. 20, 1940

2,191,202

UNITED STATES PATENT OFFICE 2,191,202

VEHICLE WHEEL

Harry W. Kranz, Lakewood, Ohio, assignor to The Cleveland Welding Company, Cleveland, Ohio, a corporation of Ohio Application November 19, 1934, Serial No. 753,673

6 Claims. (Cl. 152—411)

This invention, relating as indicated to rims, pertains more particularly to vehicle rims adapted to removably support inflatable tires.

It is the principal object of this invention to provide a rim of the character having radially extending flanges along opposite sides thereof for the purpose of retaining the tire on the rim, one of such flanges being removable to facilitate mounting and demounting of the tire on the rim.

It is a further object of the invention to provide a rim assembly of the character described, in which the removable tire-retaining flange is in the form of an endless side ring so that there are no breaks or latches on either the rim or the side ring, resulting in a structure characterized by unusual strength and resistance to failure when subjected to the rough usage to which devices of this character are subjected.

It is a further and more particular object of this invention to provide a rim assembly of the character described characterized by the fact that the possibility of misalignment between the rim and ring is practically eliminated so that when the tire is inflated the ring will be forced on to its proper seat on the rim and there securely held against accidental displacement. Other objects of this invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:

Fig. 1 is a transverse sectional view of a rim assembly constructed in accordance with the principles of this invention; Fig. 2 is a transverse sectional view similar to Fig. 1, but showing a modified form of construction; Fig. 3 is a fragmentary sectional view drawn to an enlarged scale of a portion of the rim illustrated in Fig. 1; Fig. 4 is a view similar to Fig. 3, but showing a portion of the rim illustrated in Fig. 2; Fig. 5 is a fragmentary transverse sectional view through a rim such as shown in Fig. 1 and Fig. 6 is a view similar to Fig. 5 but showing the ring off its seat and in the bottom of the groove.

Referring now more particularly to the drawings and more especially to Fig. 1, the rim assembly here illustrated consists of a cylindrical body portion 1 having a conventional radially extending tire-retaining flange 2 formed integrally therewith along one side. Along the other side of the cylindrical portion 1 there is provided a groove generally indicated at 3, the associated wall structure of which, along with the endless tire-retaining side ring 4 being the features of the rim assembly to which this invention particularly pertains.

The groove 3 is of such depth that the side ring 4 may be mounted on or taken off from the rim in the manner defined in my United States Patent No. 1,963,854, as well as in Gammeter Patent No. 895,360. In other words, the endless side ring 4 is applied to and taken off from the rim in the same manner that a tire casing is mounted and taken off from the so-called "drop-center" type tire rim.

The groove 3 is bordered on its outer side by a substantially radially extending flange 5, upon which there is formed a tapered or coniform seat 6, which is adapted to be engaged by a complementary seat 7 on the ring 4.

The bottom of the groove 3, or more particularly the right-hand wall thereof, as viewed in Fig. 3, comprises a sloping or conical portion 8, which extends to the inner substantially radially extending face 9 of the flange 5. The angle of inclination $a$ of the seat 6 to the axis of the rim should be at least as great as the angle of inclination $b$ of the sloping or coniform face 8.

The function and manner of use of the above described form of construction is briefly as follows. With the ring 8 removed from the rim, a tire of the conventional type is placed on the rim. The ring 4 is then mounted on the rim in the manner previously explained, i. e., in the manner in which the "drop-center" type tire is placed on a "drop-center" type tire rim. After the ring 4 has been thus assembled on the rim the tire may be inflated. Inflation of the tire will exert an axial pressure to the right on the ring 4, as viewed in Fig. 1. Should the ring 4 be disaligned with respect to the rim, i. e., if the ring should at one side be in the bottom of the groove 3 and not properly seated on the seat 6 of the flange 5, the axial pressure to the right of the ring 4 will cause the inner face 10 of the ring 4 to ride upwardly on the sloping bottom 8. It will be noted that the various parts of the ring and rim are so proportioned that the edge 11 of the ring 4 will clear the corner 12 on the rim as the ring 4 moves to the right onto the seat 6.

With the angle $a$ at least as great as the angle $b$, i. e., in the neighborhood of 18 degrees, proper seating between the seats 7 and 6 respectively, on the ring and rim is insured as the ring is forced to the right when the tire is inflated.

The modification illustrated in Figs. 2 and 4 is substantially identical with that illustrated in Figs. 1 and 3, with the exception that in the construction illustrated in Figs. 2 and 4 the face 9a of the flange 5, instead of extending truly radially as in Fig. 3, is inclined inwardly by the amount of angle c, which may conveniently be about 5 degrees. This reverse inclination of the face 9a is for the purpose of insuring that the seats 6 and 7 on the rim and ring respectively move into proper engagement, and such proper engagement will not be prevented by the inner periphery 10 of the ring engaging the face 9a. In every other principal respect the two forms of construction are identical so that it is believed unnecessary to further describe or explain the function and operation of the construction illustrated in Figs. 2 and 4.

It will be noted from an inspection of several figures that the distance between the lines x and y is greater than the distance between lines y and z. Due to this fact it will be noted that when the side ring 4 rests on the bottom of the groove 3, the diametrically opposite inner periphery of the ring 4 will be within the groove 3, i. e., radially inwardly of the outer periphery of the seat 6 as defined by the line x. In other words, the diameter of the inner periphery of the side ring 4 is less than the distance from the bottom of the groove 3 on one side of the ring to the radially outer edge of the seat 6 at a diametrically opposite point on the rim.

As previously indicated, the ring member may be mounted and dismounted on the rim in the manner disclosed in my previously identified patent and such manipulation of the ring is facilitated by relieving either the inner periphery of the ring or the outer periphery of the flange on the rim bordering the groove upon which the ring normally seats.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a vehicle wheel rim assembly, the combination of a tire supporting rim, and an endless tire-retaining ring capable of being removably secured to said rim, said rim member provided along one edge with a groove, the outer wall of said groove sloping uniformly from adjacent the bottom of said groove to a substantially radially extending flange upon which is provided a seat for said ring, and said ring so formed that when the same is positioned in said groove axial pressure in one direction thereon will move said ring onto said seat on said rim.

2. In a vehicle wheel rim assembly, the combination of a tire supporting rim, and an endless tire-retaining ring capable of being removably secured to said rim, said rim member provided along one edge with a groove, the outer wall of said groove sloping uniformly from adjacent the bottom of said groove to a reversely inclined radially extending flange upon which is provided a seat for said ring, and said ring so formed that when the same is positioned in said groove axial pressure in one direction thereon will move said ring onto said seat on said rim.

3. In a vehicle wheel rim assembly, the combination of a tire supporting rim, and an endless tire-retaining ring capable of being removably secured to said rim, said rim member provided along one edge with a groove, the outer wall of said groove sloping uniformly from adjacent the bottom of said groove to a substantially radially extending flange upon which is provided a coniform seat for said ring, and said ring so formed that when the same is positioned in said groove axial pressure in one direction thereon will move said ring onto said seat on said rim.

4. In a vehicle wheel rim assembly, the combination of a tire supporting rim, and an endless tire-retaining ring capable of being removably secured to said rim, said rim member provided along one edge with a groove, the outer wall of said groove sloping uniformly from adjacent the bottom of said groove to a reversely inclined radially extending flange upon which is provided a coniform seat for said ring, and said ring so formed that when the same is positioned in said groove axial pressure in one direction thereon will move said ring onto said seat on said rim.

5. In a vehicle wheel rim assembly, the combination of a tire supporting rim, and an endless tire-retaining ring capable of being removably secured to said rim, said rim member provided along one edge with a groove, the outer wall of said groove sloping uniformly from adjacent the bottom of said groove to a substantially radially extending flange upon which is provided a sloping seat for said ring, the inclination of said seat to the axis of said rim being at least as great as the inclination of said groove wall, and said ring so formed that when the same is positioned in said groove, axial pressure in one direction thereon will move said ring upwardly on said sloping wall and into engagement with said sloping seat.

6. In a vehicle wheel rim assembly, the combination of a tire-supporting rim, an endless tire-retaining ring capable of being removably secured to said rim, said rim member provided along one edge with a groove, the outer wall of said groove sloping uniformly from adjacent the bottom of said groove to a substantially radially extending flange upon which is provided a seat for said ring, said ring so formed that when the same is positioned in said groove, axial pressure in one direction thereon will move said ring onto said seat on said rim and the inner diameter of said ring being less than the diametrical distance from the bottom of said groove on one side of said rim to the radially outer surface of said flange on the other side of said rim.

HARRY W. KRANZ.